United States Patent
Bill et al.

(10) Patent No.: US 8,757,584 B2
(45) Date of Patent: Jun. 24, 2014

(54) ACTUATING DEVICE

(75) Inventors: Martin Bill, Nohfelden (DE); Florian Lauer, Saarbrücken (DE); Christoph Meyer, Saarbrücken (DE)

(73) Assignee: Hydac Electronic GmbH, Saarbrüken (DE)

( * ) Notice: Subject to any disclaimer, the term of this patent is extended or adjusted under 35 U.S.C. 154(b) by 365 days.

(21) Appl. No.: 12/736,724

(22) PCT Filed: Jun. 3, 2009

(86) PCT No.: PCT/EP2009/003939
§ 371 (c)(1),
(2), (4) Date: Nov. 3, 2010

(87) PCT Pub. No.: WO2009/156047
PCT Pub. Date: Dec. 30, 2009

(65) Prior Publication Data
US 2011/0079740 A1     Apr. 7, 2011

(30) Foreign Application Priority Data
Jun. 26, 2008   (DE) .................. 10 2008 030 451

(51) Int. Cl.
*F16K 31/02*     (2006.01)
(52) U.S. Cl.
USPC .............. 251/129.02; 251/129.15; 303/119.2; 335/255; 335/260; 335/281; 335/297
(58) Field of Classification Search
USPC ........ 251/129.02, 129.15, 129.07; 303/119.2; 335/220, 260, 255, 281, 297
See application file for complete search history.

(56) References Cited

U.S. PATENT DOCUMENTS

| | | | | |
|---|---|---|---|---|
| 3,840,323 | A * | 10/1974 | Eckerle et al. | 431/90 |
| 4,056,255 | A * | 11/1977 | Lace | 251/129.15 |
| 4,805,870 | A * | 2/1989 | Mertz | 251/129.15 |
| 5,506,556 | A * | 4/1996 | Baumgartl et al. | 335/172 |
| 6,628,186 | B1 | 9/2003 | Wölfges | |
| 6,683,519 | B1 | 1/2004 | Schanzel et al. | |
| 6,776,391 | B1 * | 8/2004 | Goossens et al. | 251/129.15 |
| 7,172,171 | B2 * | 2/2007 | Doehla et al. | 251/129.15 |
| 7,614,603 | B2 * | 11/2009 | Kondo et al. | 251/129.15 |
| 2001/0032633 | A1 * | 10/2001 | Bircann et al. | 123/568.21 |
| 2004/0021104 | A1 | 2/2004 | Steinborn | |

FOREIGN PATENT DOCUMENTS

| | | |
|---|---|---|
| DE | 10 2004 051 332 A1 | 4/2006 |
| DE | 10 2005 061 184 A1 | 8/2007 |

* cited by examiner

*Primary Examiner* — John K Fristoe, Jr.
*Assistant Examiner* — Marina Tietjen
(74) *Attorney, Agent, or Firm* — Roylance, Abrams, Berdo and Goodman LLP

(57) ABSTRACT

An actuating device, particularly for actuating valves connected externally, includes a housing (10) and a coil body (12) arranged in the housing. The coil body has a coil winding (14) at least partially enclosing a coil tube (16), a pole core (20) connected at the coil tube free end, an armature (22) guided in a longitudinally displaceable manner at least in the pole tube (16) within an armature chamber (24) and interacting with an actuating part (26) for actuating the respective valve part. The pole tube (16) is designed as a receiving sleeve for the armature (22). The sleeve is fixed with its free end region to a fixed bearing point. The fixed bearing point is formed by two support parts (118, 124) of the pole core (20) that delimit a receiving gap between them, in which the free end region of the receiving sleeve is fixed in a clamped manner.

11 Claims, 10 Drawing Sheets

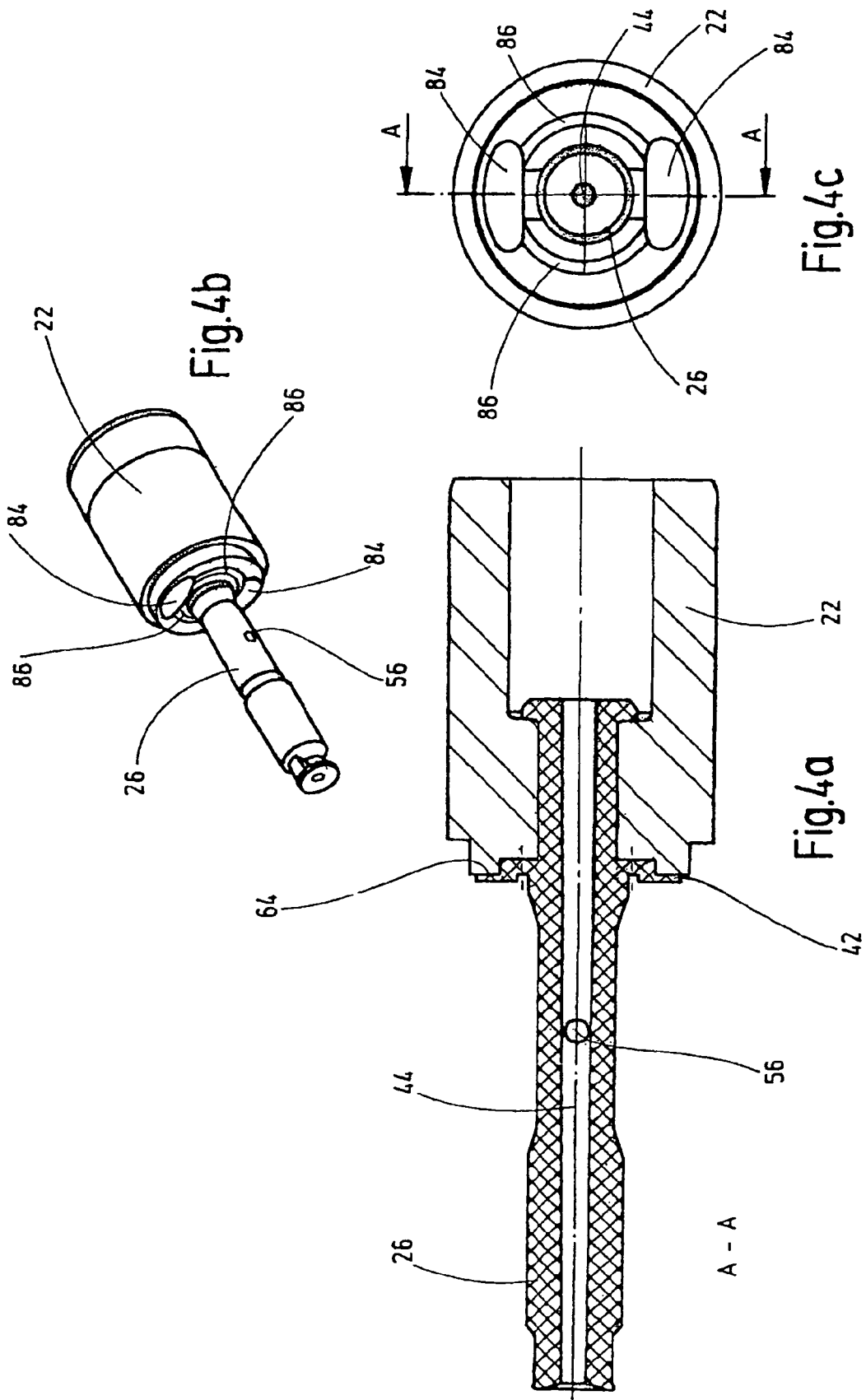

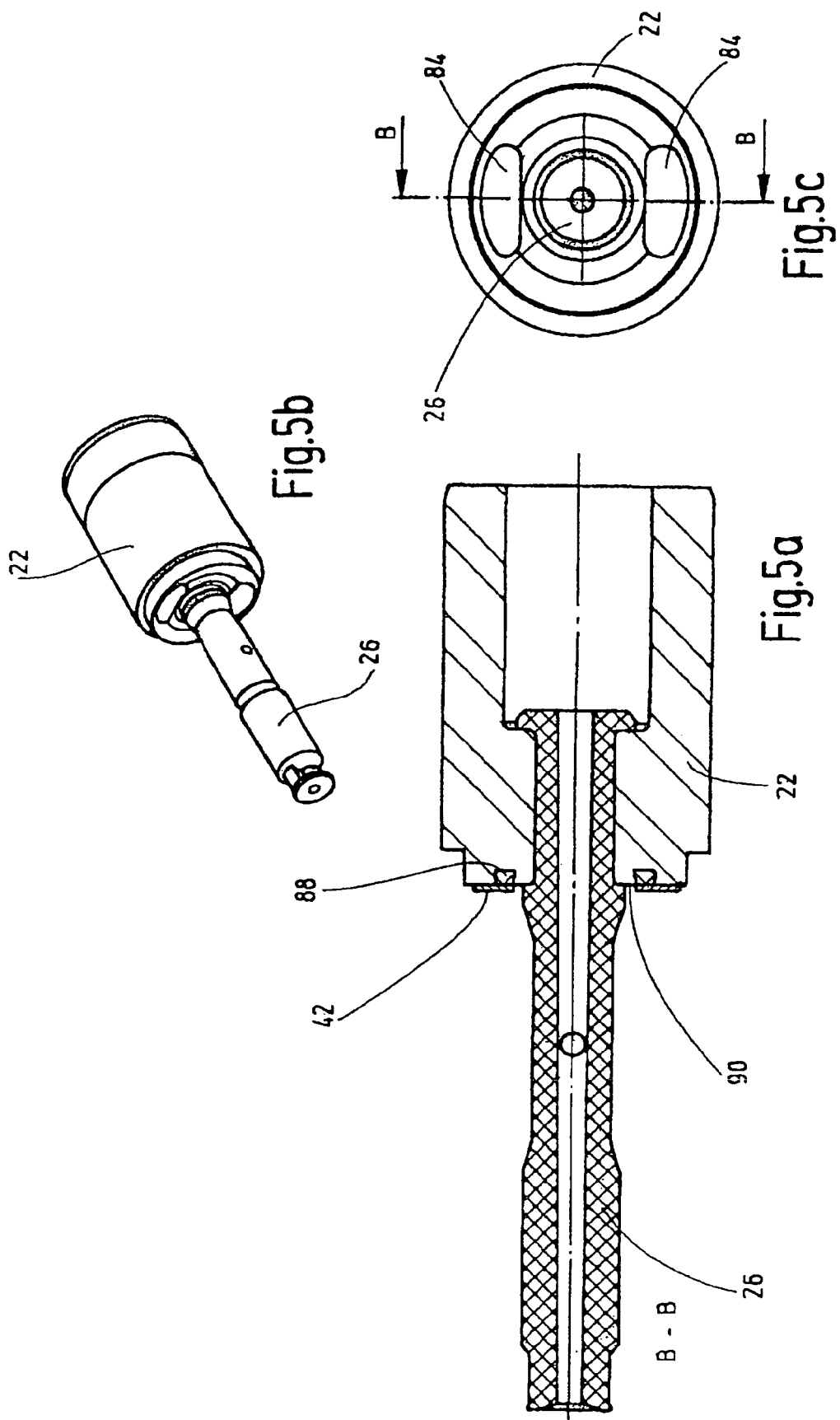

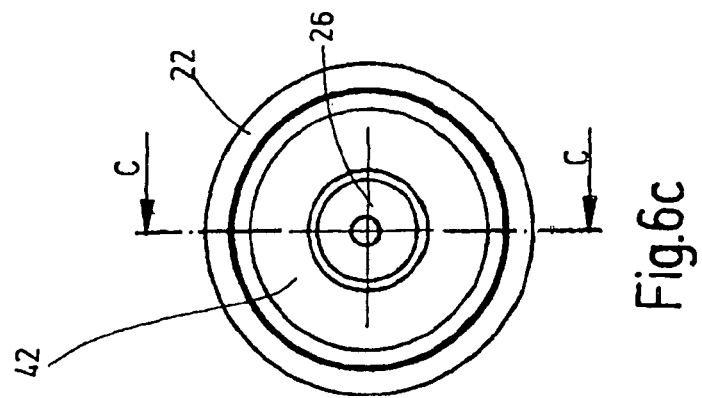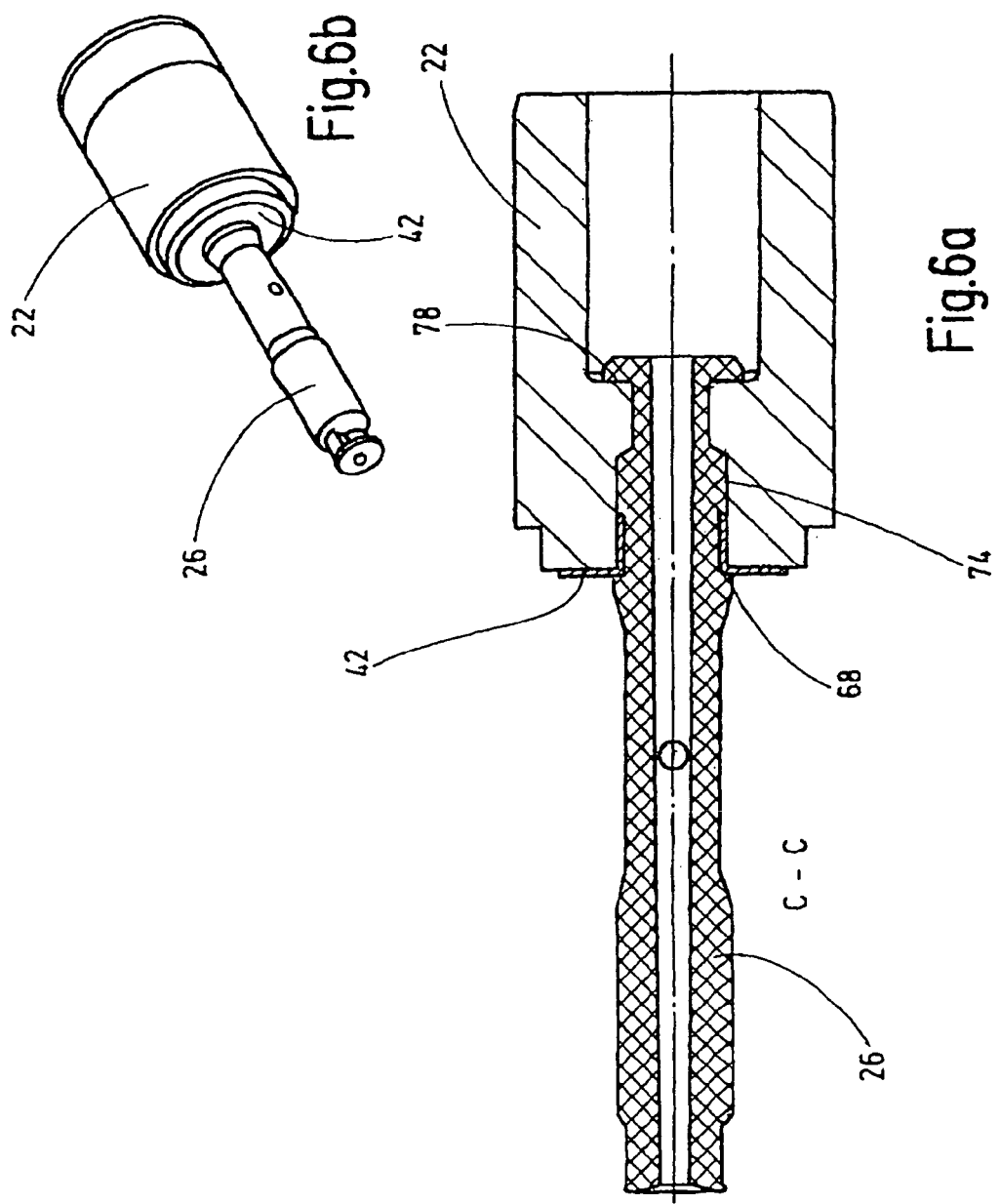

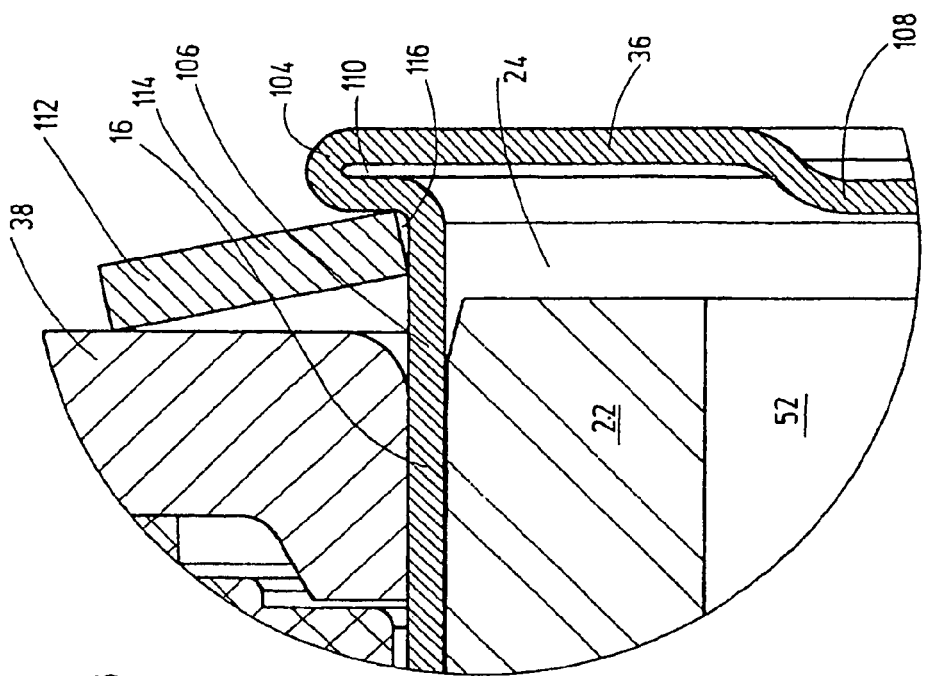
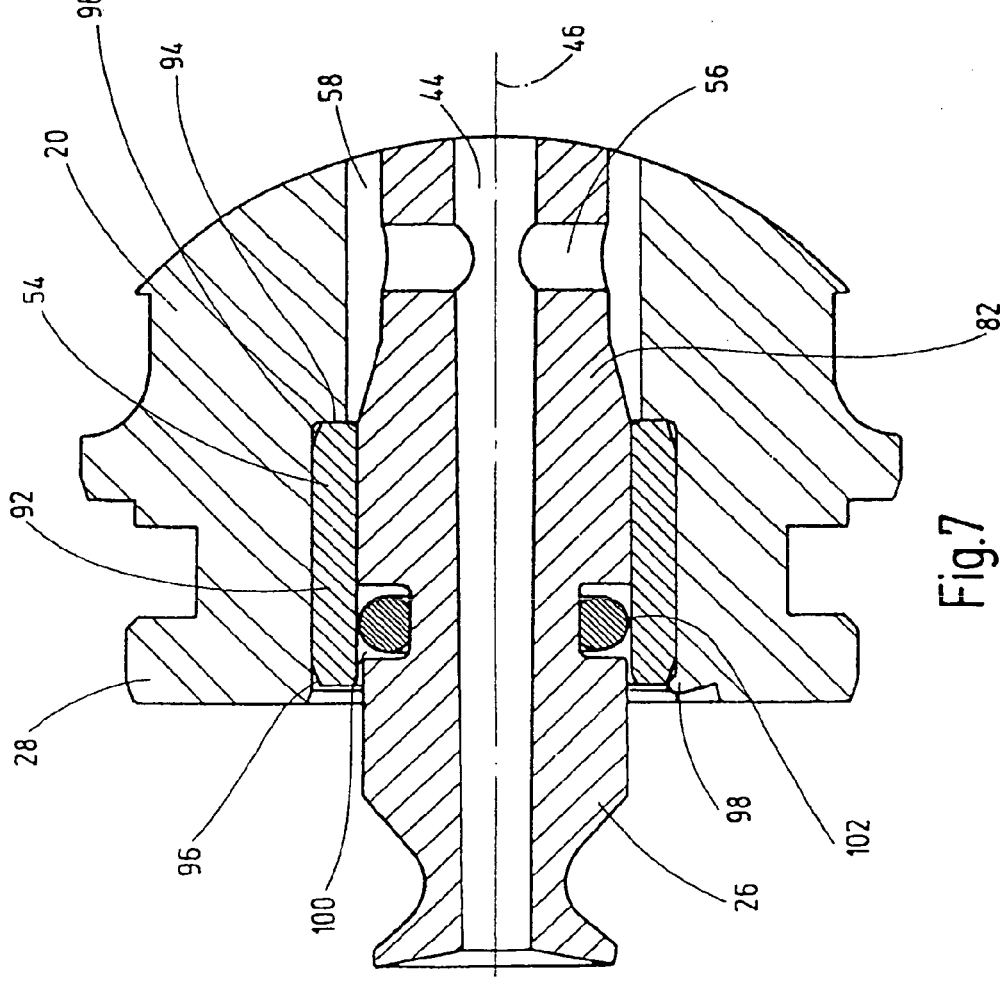
Fig.8
Fig.7 ic # ACTUATING DEVICE

FIELD OF THE INVENTION

The invention relates to an actuating device, in particular for actuating valves that can be connected externally, comprising a housing and a coil body arranged therein and having a coil winding. The coil body encloses at least in part a pole tube to whose one free end a pole core is connected. An armature is guided to be longitudinally displaceable at least in the pole tube within an armature space, and interacts with an actuating part for actuating the respective valve part. The pole tube is designed as a receiving sleeve for the armature. The receiving sleeve is fixed with its free end region at a fixed bearing point.

BACKGROUND OF THE INVENTION

DE 10 2004 051 332 A1 discloses a generic actuating device. In the known solution, the pole tube on its one free end which projects out of the housing of the actuating device is provided with a flanged edge against which the armature can be supported in its one end-side travel position. The flanged edge leaves a center opening exposed into which a pressure equalization channel of the armature discharges which on its opposite side can be supported on the pole core in whose direction the pressure equalization channel discharges on its other side. For this purpose, a loose bearing point is formed by the coil body and delimited by the housing parts for the free end edge of the pole tube, which edge is directed to the outside.

On the opposite end, the pole tube has a flanged edge of less curvature which is directed in the opposite direction, and with which it is fixed in position between the coil body and the pole core both axially and radially in a fixed bearing point. As a result of the deflections toward the free edges of the pole tube, which is designed as a receiving sleeve for the armature and which is longitudinally displaceable, the pole tube is able to produce a certain longitudinal tolerance equalization in order to form a fitted mounting for parts of the actuating device. As a result of the defined clamping site of the receiving sleeve as the pole tube at the fixed bearing point between the pole core and the coil body, these tolerance equalization possibilities are limited. In order to seal the interior of the actuating device relative to the exterior, on the inner periphery of the receiving sleeve as the pole tube there is a sealing system, preferably in the form of an elastomer gasket which, mounted in the outer groove of the pole core, ensures sealing between the pole core and the pole tube. If the elastomer gasket has not been correctly installed or it was forgotten in installation, the sealing site can fail and the interior of the actuating device is no longer sealed media-tight relative to the exterior. This failure case can also occur when the sealing system is worn and therefore has become unusable due to long-term use.

To remedy the defect of the limited tolerance equalization possibility, DE 10 2005 061 184 A1 for a likewise generic actuating device has proposed forming the flanged edge of the pole tube as a closed bottom part of a receiving sleeve which, supported by the pole core, is in contact with the latter. The bottom part of the pole tube is able to fit into the pole core such that it maintains its location, even if the armature for actuating a valve which can be connected to the actuating device moves back and forth and, in doing so, presses especially on the bottom part or is lifted off it by pulling itself. Since the flanged edge no longer borders an annular passage site, as shown above, but rather is closed, in this case, use for high pressures is possible since, in addition to pressure tightness, a stiff, loadable pole tube system is formed.

By the defined contact of the bottom part of the pole tube with the pole core, a type of fixing is achieved which enables tolerance equalization elsewhere on the pole tube in a widely drawn region. At the same time, the pole tube on its free end discharges into a bead-shaped flange which is supported on the housing of the actuating device. The bead part of the flange is designed as a round bead. This design makes it possible to position the free end region of the bead-shaped flange between the housing of the actuating device and housing parts of the adjoining valve body by clamping. As a result of the elastically resilient bead body, a type of articulation is implemented along which, especially in the axial direction, the pole tube with its installation length can be fitted within the coil body and the pole core. Between the elastically resilient bead body and the connected valve housing of the valve in turn there is an elastomer gasket which is designed to ensure a media-tight seal between the interior of the actuating device together with the valve relative to the exterior. This known sealing system can also lead to the above-described defects of the lack of media tightness.

SUMMARY OF IN THE INVENTION

An object of the invention is to provide an improved actuating solutions maintaining the prior art advantages, while having specifically reliable, long-lasting actuating operation such that a media-tight separation from the interior of the actuating device relative to the exterior is ensured with low mechanical effort and therefore cost-efficiency.

This object is basically achieved by an actuating device where the fixed bearing point is formed from two support parts of the pole core delimiting a receiving gap between them in which the free end region of the receiving sleeve is fixed by clamping. A media-tight separation between the interior of the actuating device and the exterior is then achieved. For media-tight separation it is also a contributory factor that the receiving sleeve in its preferred configuration is cup-shaped and therefore has a bottom part which is closed in itself. The entire pole tube with respect to the special configuration of the fixed bearing point along its internal periphery does not need a further sealing system, inasmuch as the system cannot fail or cannot be forgotten either. In addition, this solution saves production and installation costs with the elimination of the additionally required sealing system for the pole tube.

In one preferred embodiment of the actuating device according to the invention, one support part is formed from the constriction site of the pole core which is smaller in diameter than the remaining outside diameter of the pole core in the region of the fixed bearing point. The step-shaped transition region resulting therefrom forms a caulk surface as another support part of the pole core. Accordingly, a media-tight, especially gas-tight, fixed bearing point can be achieved by inserting the crimped end edge of the pole tube into the constriction site in a first production step and by caulking the step-shaped transition region over the outside of the pole tube in a second step so that a positive and non-positive connection is achieved. These production steps can be economically implemented.

In another preferred embodiment of the actuating device according to the invention, at a loose bearing point for the receiving sleeve a reset device acts on and applies a force to the receiving sleeve, which receiving sleeve is oriented away from the fixed bearing point. In this way, tolerance equalization for the entire system can be achieved within a very widely drawn framework. This amount of equalization can be stipulated by way of a suitable selection of the reset device. Regardless of the possible production tolerances of the individual components of the actuation device, the associated tolerance can thus be compensated and, in this respect, individually equalized via the reset device acting on the receiving sleeve.

Although the reset device attempts to pull the pole tube out of the fixed bearing point, this does not affect the media-tight clamping by the caulked pole core material since the free end region of the pole tube is transferred, as a type of thrust bearing, by an arc-shaped transition region out of the constriction site into a guide section. With a diameter which has been widened relative to the outside diameter of the constriction site, the guide section provides for permanent support between the pole tube and the pole core in this region, and thus, at the same time ensures relief for the fixed bearing point over a longer path. This axially running guide section merges with the bent transition region and implements a longer sealing distance which acts as an escape barrier for the respective medium even in the form of a gas.

In another, especially preferred embodiment of the actuating device according to the invention, the fixed bearing point for the receiving sleeve is provided on its free end edge and is caulked accordingly with the pole core as shown. The loose bearing point on the opposite end of the pole tube is arranged in the region of the closed bottom part, particularly at the point at which the pole tube emerges from the housing of the actuating device. Supporting is achieved by the coil bodies and/or by the housing parts which are penetrated by the pole tube. By the action of the reset device, preferably in the form of an energy storage device, for example, in the form of a disk spring, on the loose bearing point, the receiving sleeve with its inner periphery is accordingly drawn lengthwise and equalizes possible unevenness along its inner periphery. In this respect, the receiving sleeve as a pole tube is kept permanently under tensile stress so that sealing contact is achieved between the inner periphery of the pole tube and the outer periphery of the pole core along the indicated guide distance. Since especially the elastomer parts of the sealing system can be damaged upon contact with metallic wall parts, the desired media-tightness is ensured by omitting this sealing system in the metallic wall region.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale:

FIG. 4a is a side elevational view in section of a part of the production form relating to the injection process of an actuating part onto the armature of the actuating device according to a second exemplary embodiment of the present invention;

FIG. 4b is a perspective view of the part of FIG. 4a;

FIG. 4c is a front elevational view of the part of FIG. 4a;

FIG. 5a is a side elevational view in section of a part of the production form relating to the injection process of an actuating part onto the armature of the actuating device according to a third exemplary embodiment of the present invention;

FIG. 5b is a perspective view of the part of FIG. 5a;

FIG. 5c is a front elevational view of the part of FIG. 5a;

FIG. 6a is a side elevational view in section of a part of the production form relating to the injection process of an actuating part onto the armature of the actuating device according to a fourth exemplary embodiment of the present invention;

FIG. 6b is a perspective view of the part of FIG. 6a;

FIG. 6c is a front elevational view of the part of FIG. 6a;

FIG. 7 is an enlarged partial side elevational view in section of the actuating device shown in circle A in FIG. 1;

FIG. 8 is an enlarged partial side elevational view in section of the actuating device shown in circle B in FIG. 1;

DETAILED DESCRIPTION OF THE INVENTION

Figure 1:
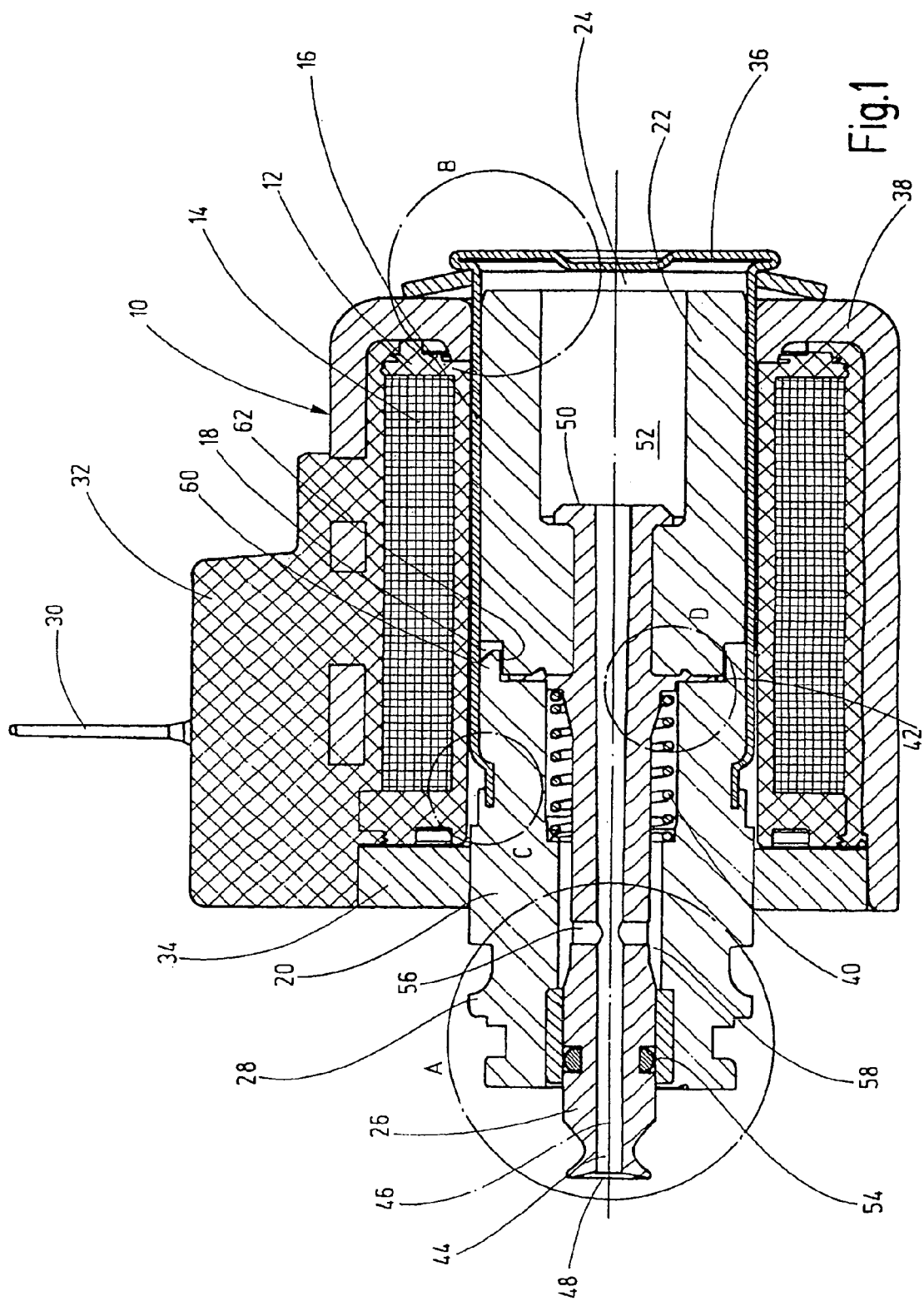
FIG. 1 is a side elevational view in section of an actuating device without a connected valve device according to a first exemplary embodiment of the invention.

The actuating device which is shown in a longitudinal section in FIG. 1 and which is also referred to as an "actuating or switching magnet" in the technical jargon has a housing 10 with a coil body 12 located therein with a coil winding 14. This coil body 12 comprises at least in part a pole tube 16 which is essentially magnetically decoupled from a pole core 20 by a point of separation 18 in the form of a site which is left open. The prior art also discloses solutions (not shown) in which a corresponding point of separation is formed by a weld or the like. Along the pole tube 16, an armature 22 is guided to be longitudinally displaceable in an armature space 24 which on its one free, front end interacts with a rod-shaped actuating part 26 for actuating fluid valves (not shown) of conventional design, especially in the form of pneumatic valves (not detailed). To connect this valve, the pole core 20 on its free end is provided with a connecting flange 28. The connecting flange 28 on its outer periphery has depressed ring grooves for at least partially accommodating the corresponding elastomer gaskets and for routing the media flows.

To energize the coil winding 14 of the coil body 12, which preferably is formed of at least one conductive copper wire, a plug part 30 is preferably permanently connected to the remaining parts of the housing 10 by a sealing compound 32. Viewed in the direction of FIG. 1, on the left side and to the outside, an annular pole plate 34 ending with the sealing compound 32 is inserted and is caulked accordingly for securely holding it in the housing 10. In addition, the pole plate 34 encompasses the outer periphery of the pole core 20, which is held in the installation position shown in FIG. 1 in the actuating device by the valve device (not detailed). The pole tube 16 is designed cup-like as a receiving sleeve. The bottom part 36 of the pole tube 16 forms a stop limit for the armature 22 in its travel position, which is on the extreme right viewed in the direction of FIG. 1. The sealing compound 32 together with the coil body 12 is formed of a plastic material such as, for example, polyamide, preferably PA6. The sealing compound 32 on the top side of the actuating device and along its bottom side engages recesses of a cup-like housing jacket 38, which is likewise a component of the housing 10. Both the housing jacket 38 and the armature 22, as well as the pole core 20, and the pole plate 34 are formed of a metallic material, with all these parts being of the same material. The pole tube 16 is preferably produced from a high-grade steel material which can be magnetically conductive or nonconductive depending on the application.

If the coil winding 14 and therefore the coil are energized by the plug part 30, the armature 22 then is moved into its actuated position shown in FIG. 1, that is, viewed in the direction of FIG. 1 from a right position into the left position which corresponds to the actuating position as shown in FIG. 1. In this traveling motion, the armature 22 entrains the rod-shaped actuating part 26 whose free end, for an actuating process on the pneumatic valve (not detailed), in each of its travel positions projects out of the housing 10 and particularly out of the pole core 20. In this traveling motion of the armature 22, viewed in the direction of FIG. 1 to the left, an energy storage device in the form of a compression spring 40 is pretensioned. As soon as the coil winding 14 is kept de-energized, the pretensioned compression spring 40 pushes the armature 22 back into its right initial position in which it can also make contact with the inside of the bottom part 36 of the pole tube 16. In this de-energized state, the connected valve device is switched open, de-energized. In one modified embodiment (not shown) of the actuating device according to the invention, it could also be provided that the energy storage device in the form of the compression spring 40 be moved into the connected valve device in order to induce the indicated reset position of the armature 22 together with the actuating part 26.

Even when the current drops out, as a result of residual magnetism processes in the pole core 20 and in the pole plate 34, it can happen that the armature 22 with its one free face remains adhering to the adjacent face of the pole core 20 facing it. To avoid this occurrence, between the two faces within the armature space 22 an anti-adhesion device 42 is inserted which encompasses the rod-like actuating part 26 with a radial distance in order to effectively execute decoupling. The rod-shaped actuating part 26 is penetrated by a center channel 44 which extends along the longitudinal axis 46 of the armature 22 and the actuating part 26, which in this case also forms the optional axis of motion. The indicated middle channel 44 thus emerges into the exterior on the two opposite faces 48, 50 of the actuating part 26. In particular, the center channel 44 on the right face 50 of the actuating part 26 leads into an open space 52 of the armature 22, the open space 52 in turn leading into the armature space 24, carrying pressure and medium. In the region between a sealing site 54, which also forms a guide for the front end of the actuating rod 26 and the armature 22, there is a cross channel 56 which with its one end discharges into the center channel 44 and with its other end emerges into a center space 58 which is encompassed by the pole core 20.

The components including the center channel 44, cross channel 56, center space 58, open space 52, and armature space 24 form a type of pressure equalization system which is connected to a valve unit (not detailed) and compensates the pressure media originating from the valve unit such that the travel motion of the armature 22 together with the actuating part 26 is not adversely affected by possible pressure differences. Optionally, the pressure media guided in this way can also effectively support the actuating force to be applied by the armature 22 as a result of different area ratios. In the region of the point of separation 18, the pole core 20 with a lug-like annular projection 60 overlaps the stepping 62 of the armature 22 offset in this region such that in each travel position of the armature 22 it is guided within the annular projection 60 so that the size of the point of separation 18 changes depending on the direction of travel of the armature 22.

Figure 3:
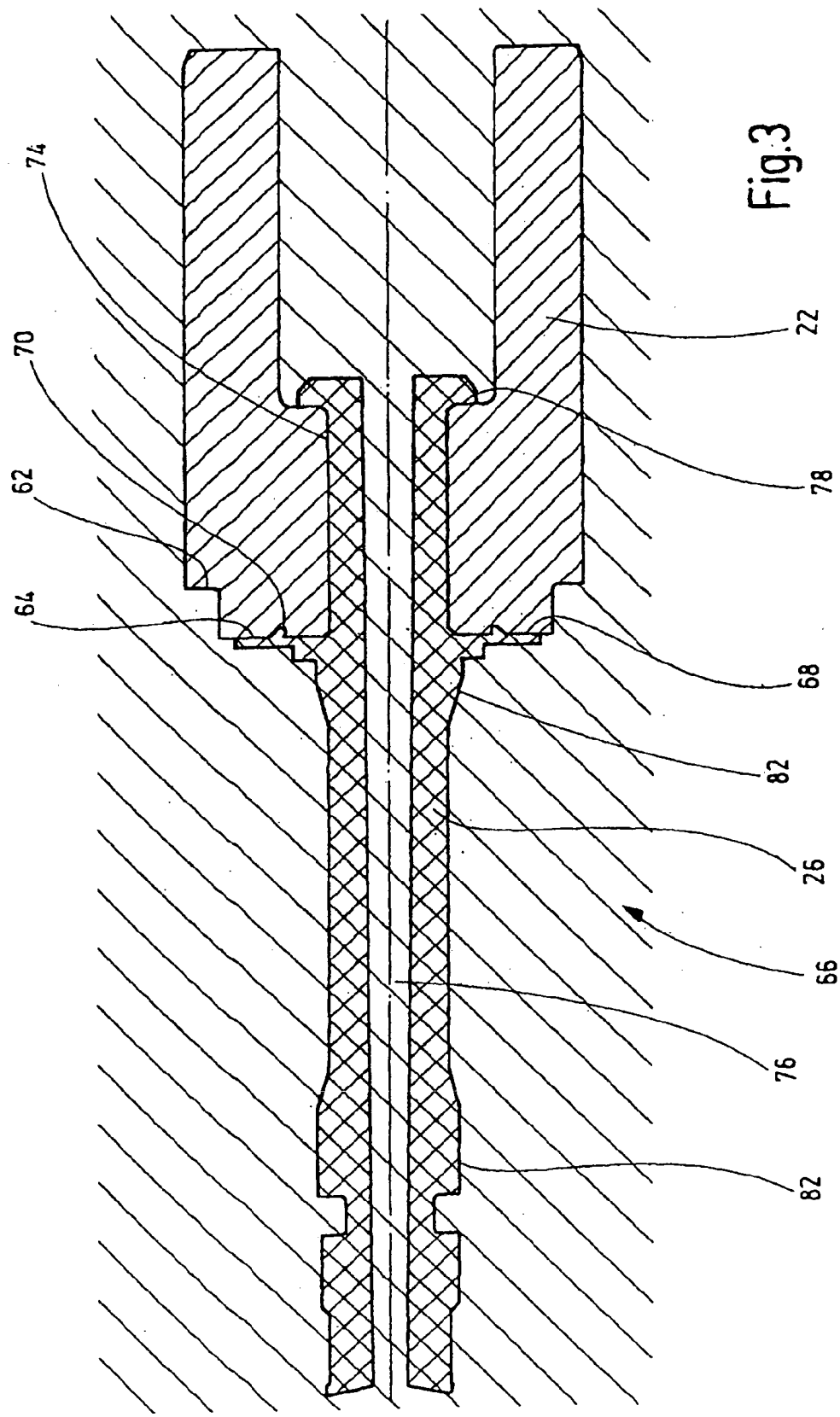
FIG. 3 is a side elevational view in section of part of the production form relating to the injection process of an actuating part onto the armature of the actuating device of FIG. 1.

The rod-like actuating part 26 is formed from an injectable material which is injected onto the armature 22, especially as shown in FIG. 3 in a connecting region 64. When reference is made here to injection, this includes conventional injection, casting, and diecasting methods. The injectable material of the actuating part 26 can fundamentally be any material which can be processed in this way. But preferably, a plastic material is used, especially a thermoplastically processable plastic. The use of polybutylene terephthalate (PBT) has proven especially advantageous; it allows injection molding at mass temperatures from 230° C. to 270° C. The plastic material used has the necessary strength and stiffness, and the sliding and wear behavior has proven very good in practical tests for the application under consideration here. In this exemplary embodiment, the entire actuating part 26 is formed from an injectable plastic material. It is also possible to form the actuating part 26 in the front region from a conventional metal rod material, which is then injected only in the transition region to the armature 22 by injectable material.

Figure 2:
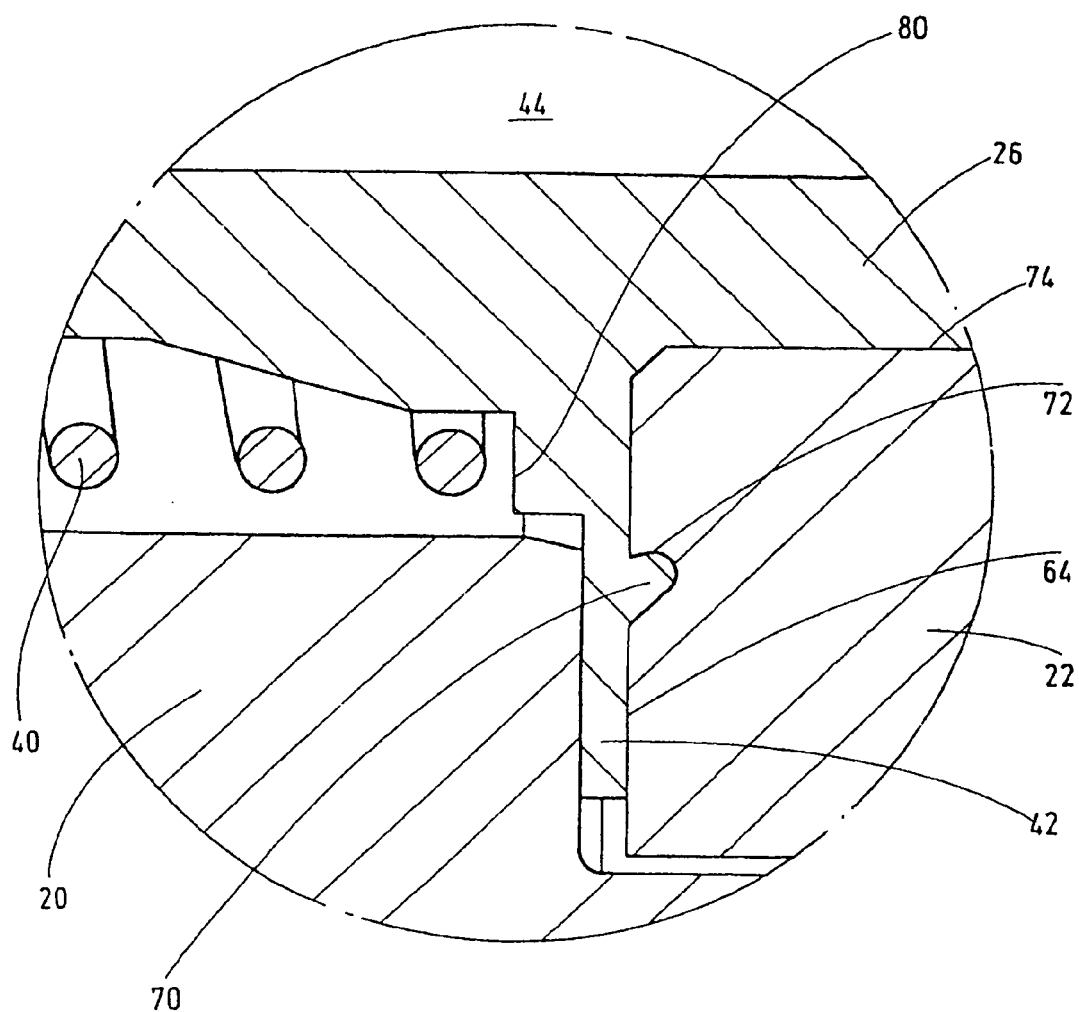
FIG. 2 is an enlarged partial side elevational view in section of the actuating device shown in the circle D in FIG. 1.

FIG. 3 shows an injection mold 66, in part and in its fundamental structure. For the mold removal process, this injection mold 66 is made in several parts (not shown) and can be assembled with its parts into the complete mold as shown in FIG. 3. The metal armature 22 is inserted into the injection mold 66 and on its free face forms the connection region 64. The possible injection surface 68 formed in this way is delimited to the outside by the wall of the injection mold 66 and is chosen such that it at least does not project above the free face of the armature 22 in this region. Furthermore, within the injection surface 68 a peripheral, annular groove-like depression 70 is made in the free face of the armature 22. It is shown enlarged in FIG. 2 and forms a type of undercut configuration 72 so that the injected plastic material can be held accordingly in the undercut in the armature 22 along the connecting region 64 by hooking underneath. Furthermore, the armature 22 has a centrally running center opening 74 which is penetrated by the actuating part 26, as shown in FIG. 3. A correspondingly inserted mold core 76 enables this configuration. Since the center opening 74 emerges into the widening open space 52, another support surface is formed there as the second injection surface 78 of the armature 22. In the region of the second injection surface 78, the plastic material of the fastening part 26 overlaps the widening step formed here so that in the two directions of travel of the armature 22 secure anchoring of the actuating part 26 by the injection process is ensured.

The injection mold 66 as shown in FIG. 3 is designed so that the rod-like actuating part 26 widens radially to the outside with the formation of the already described disk-like anti-adhesion device 42. In this case, the pole core 20 is reliably decoupled from the armature 22, and the anti-adhesion device 42 also forms a type of stop protection for the armature 22. As FIG. 2 in particular shows, between the disk-shaped anti-adhesion device 42 and the remaining enclosure front of the actuating part 26, a stop step 80 is formed on which one free end of the energy storage device in the form of the compression spring 40 is supported. In this respect, the actual anti-adhesion device 42 is relieved of the force applied by the compression spring 40, which otherwise in any travel position of the armature 22 presses the rod-like actuating part 26 in the direction of the connecting region 64 of the armature 22. As furthermore follows from FIGS. 1 and 3, the center space 58 tapers to both sides by the rod-shaped actuating part 26 widening conically in diameter along two transition regions 82.

The embodiment as shown in FIGS. 4a-c is at least modified such that in the connecting region 64 the injected plastic material has kidney-shaped widenings 84 to increase the linking mass, in turn the anti-adhesion device 42 being a one-piece component of the actuating part 26. As a result of the diametrically opposite annular depression sites 86 which adjoin the kidneys 84 on both sides as circle segments, the energy storage device in the form of the compression spring 40 need not rest entirely on the injected plastic material, but for improved support can be directly supported on the metal regions of the armature 22.

The embodiment as shown in FIGS. 5a-c corresponds in terms of its fundamental structure to the embodiment as shown in FIG. 4. However, the anti-adhesion device 42 is securely connected on the face side as an anti-sticking washer via a corresponding engagement site 88 to the armature 22. In this case, the compression spring 40 with its one end directly adjoins the face of the armature 22 in the region of the annular gap 90, formed by the intermediate distance from the outer periphery of the fastening part 26 to the inner periphery of the anti-sticking washer of the anti-adhesion device 42, which has been formed independently.

In the embodiment as shown in FIGS. 6a-c, in turn the anti-adhesion device 42 is formed of an anti-sticking cup which with its radial enclosure edge adjoins the face of the armature 22 and otherwise engages the middle opening 74 of the armature 22 with its bottom part which is cylindrically arched inward. In this respect, the actuating part 26 with its injectable plastic material only in the region of the second injection surface 78 directly adjoins the armature 22. The first injection surface 68 is formed by the contact with the top side of the indicated anti-adhesion device 42.

FIG. 7 shows the actuating device with the sealing site 54, which seals the center space 58 to the outside relative to the free surrounding space into which the free end of the actuating part 26 projects. The indicated sealing site 54 is formed from a ring body 92 which is inserted into a shoulder-like widening 94 on the free end of the pole core 20, specifically, is pressed in there. For this pressing process, the ring body 92 toward its two free ends has conical insertion aids 96. The ring body 92 is formed from a material with good sealing and sliding properties. In addition to injectable plastics such as polyamide, nonferrous metal materials could also be used. To the extent good sliding properties are required, a PTFE material can also form the ring body 92. So that the ring body 92 remains securely in the receiver in the pole core 20, the pole core 20 can moreover be at least partially flanged along its free inner region so that the flange edge sections 98 to the outside form an effective stop boundary. The flange edge can also be made circumferential instead of the sectional configuration.

As FIG. 7 further illustrates, an elastomer gasket 102 is inserted into an annular groove 100 and ensures sealing between the center space 58 and the free exterior. Moreover, between the annular groove 100 and the adjacent transition region 82 of the actuating part 26, the diameter of the actuating part is widened and hence is in direct sliding contact with the inside of the ring body 92 which is preferably made as a compression sleeve. This arrangement yields additional sealing next to the elastomer gasket 102 and ensures exact, end-side guidance for the actuating part 26 along the longitudinal or travel axis 46. On the side to the transition region 82 facing away, conversely, the outside diameter of the actuating part 26 is reduced in order to ensure unobstructed operation and to avoid any adverse effect on the entry process of the actuating part 26 at the site of the transition to the ring body 92.

As shown especially by FIG. 8 in conjunction with FIG. 1, the pole tube 16, viewed in the direction of the figures, emerges on the right edge from the jacket 38 of the housing 10, and is provided with a widened and deflected edge 104 which extends with a definable axial distance to the outside wall of the housing jacket 38. This configuration forms a type of loose bearing point. The edge 104 formed in this way forms the transition site between the cylindrical pole tube wall 106 and the bottom part 36 which extends transversely to it. Toward its middle, the bottom part 36 in the direction of the armature space 24 is provided with an offset 108 which projects in the right stop position of the armature 22 into its open space 52. Otherwise, the elastically resilient bottom part 36 forms a stop cushioning for the striking armature 22 if it assumes its travel position on the extreme right as shown in FIG. 1.

The flanged edge 104 enhances this effect by forming an elastically resilient articulation. A peripheral gap 110, into which medium can travel, leads into the edge 104 formed in this way. This arrangement in turn promotes stiffening of the entire system in this region. It is especially advantageous that for the pole tube 16 in any temperature state, tolerance equalization is created by an elastically resilient reset device 112 in the form of an energy storage device, for example, formed from components of a disk spring 114, of which FIG. 8 shows one segment part. Instead of the individual segment disk spring 114 as shown in FIG. 8, essentially, however, there could be a disk spring assembly or other reset devices, for example, in the form of a conventional helical spring which acts as a compression spring. A spring bellows or a pretensioned elastomer ring could also be used here if its use were possible at all based on the prevailing temperatures.

The reset device 112, preferably in the form of a disk spring 114, with its one end acts effectively on the free face of the housing jacket 38 and is supported with the other free end on a deflection region 116 at which the cylindrical pole tube wall 106 passes into the projecting edge 104. With respect to a high degree of corrosion resistance, the pole tube 16 is formed from a high-grade steel material. The reset device 112 used also has the advantage that when vibrations occur on the actuating device, the pole tube 16 is decoupled relative to the housing 10. The projection selected to the right for the edge 104 relative to the free face of the housing jacket 38 is chosen such that the respective reset device 112 with its pretensioning can reliably act on the pole tube 16 and that the pole tube can be located on the remaining housing 10, saving installation space. The indicated offset 108, moreover, ensures that the pole tube 16 is reinforced in its pertinent bottom part region 36 so that residual deformations cannot occur in the event of striking of the armature 22.

Figure 9:
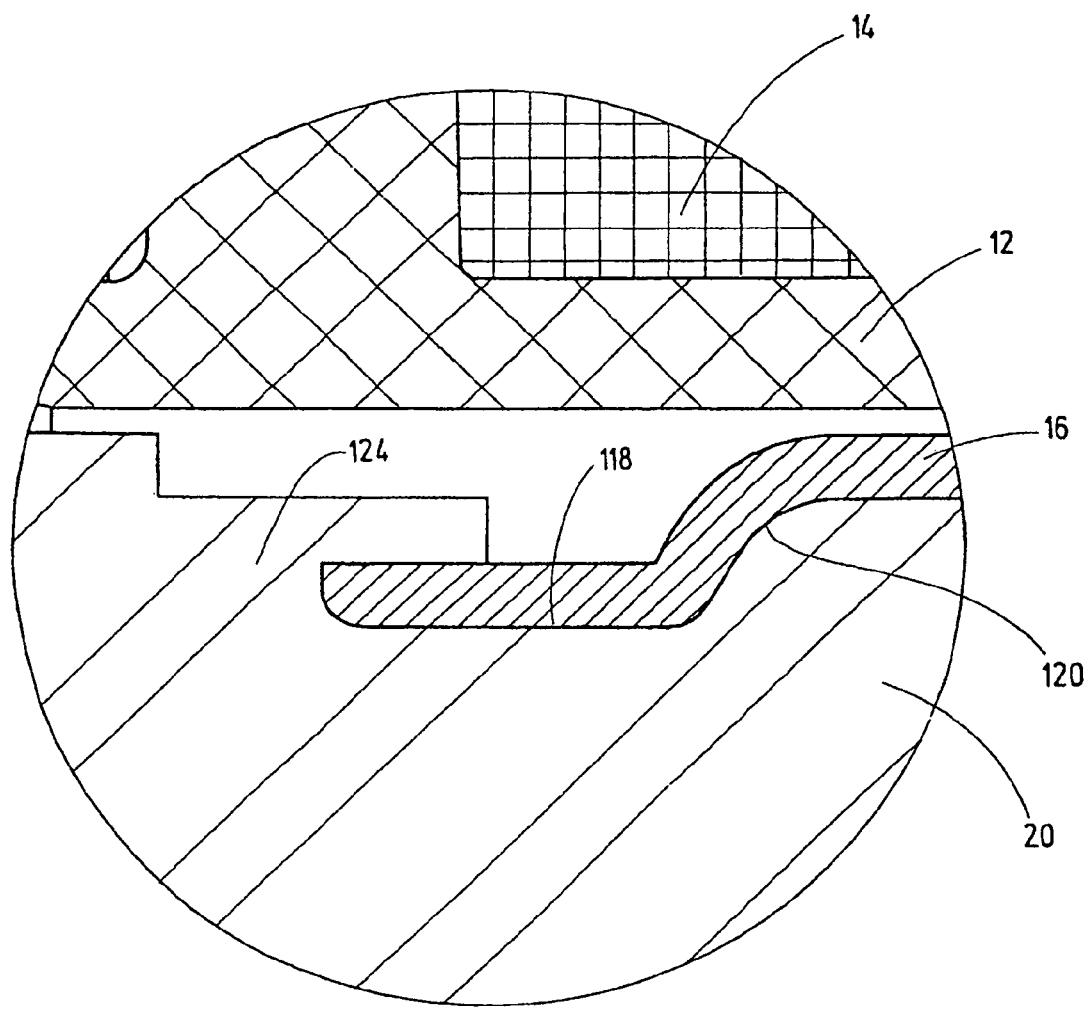
FIG. 9 is an enlarged partial side elevational view in section of the actuating device shown in circle C in FIG. 1.
Figure 10:
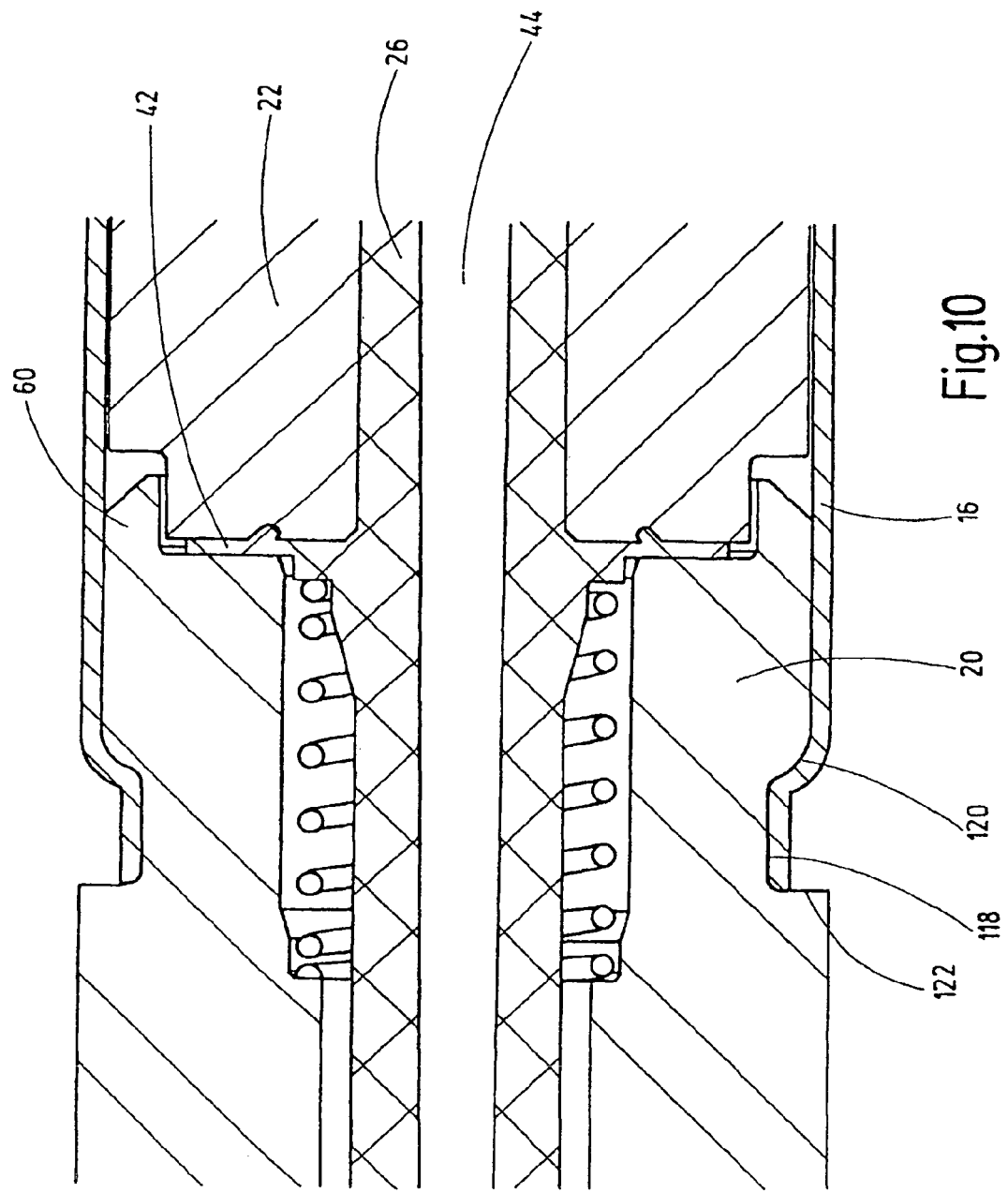
FIGS. 10 and 11 are enlarged partial side elevational views in section of the individual production steps for the actuating device of FIG. 9.
Figure 11:
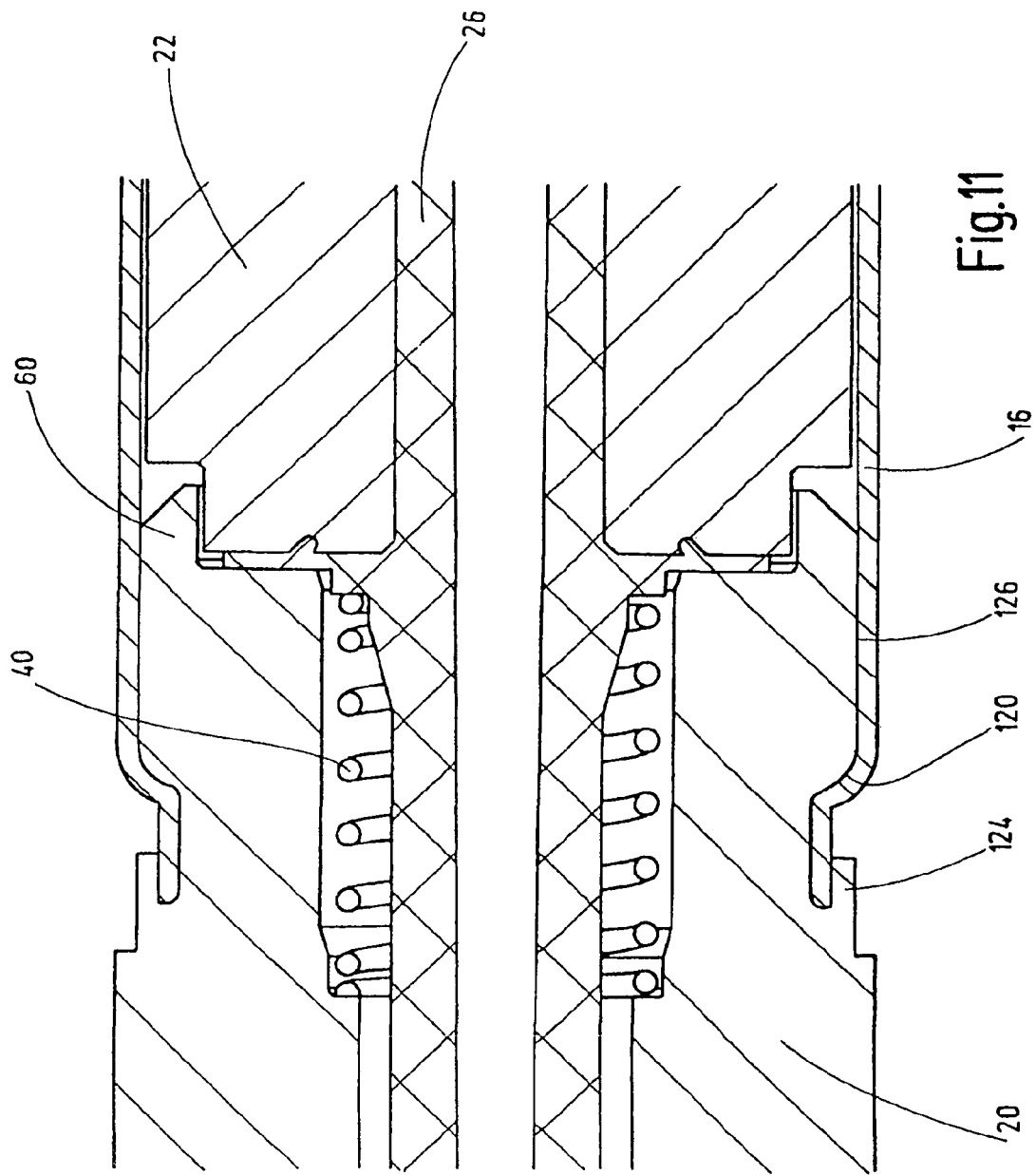

The solution, as shown in FIGS. 9 to 11, shows the left linking site of the pole tube 16 to the stationary pole core 20 as a fixed bearing point. For this purpose, the pole core 20 in the direction of its annular projection 60 has an annular groove-like constriction site 118 which passes into the remaining outside diameter of the pole tube 20 in the direction of the annular projection 60 in an arc-shaped transition region 120 (cf. FIG. 1). FIG. 10 shows that the step-shaped transition region 122 facing away from the arc-shaped transition region 120 is initially undeformed and here forms only an abutting region for the free end of the free end edge of the pole tube 16 which is flanged or caulked. When this production step is completed, as shown in FIG. 11, in a second production step the step-shaped transition region 122 is caulked to the inside along a caulk surface 124 which is offset in the direction of the pole plate 34 relative to the remaining outside diameter of the pole core 20. In this way, the free end of the pole tube 16 is fixed not only axially and radially from both sides by the pole core material which is caulked in this region, but is also kept gas-tight, i.e., the solution shown here manages without an additional elastomer gasket or other sealing system between the pole core 20 in the region of its annular projection 60 and the fixing site on the free end edge of the pole tube 16.

Since these actuating devices are also used to some extent in the high temperature range, and this fundamentally damages the elastomer material of seals, a cost-favorable sealing alternative is implemented here. Due to the arc-shaped transition region 120, the pole tube is reliably guided without major kinks in the direction of the annular projection 60 on the outer periphery of the pole tube 22 so that unnecessary material stress for the thin-walled pole tube material does not occur. With respect to this guide distance 126 and the guide centering by way of the reset device 112 on the free end region of the pole tube 16, it is ensured that bulging processes which could possibly limit the free mobility of the armature 22 with its actuating part 26 do not occur.

The actuating device according to the invention is intended especially in the low pressure range for use in pneumatic valves even in the high temperature range. With a corresponding modification, other applications are also conceivable, especially for hydraulic valves. The very lightweight actuating device has very short switching and reaction times, and extremely high load cycles, which can be in the range of multiples of millions, can be achieved.

While various embodiments have been chosen to illustrate the invention, it will be understood by those skilled in the art that various changes and modifications can be made therein without departing from the scope of the invention as defined in the appended claims.

What is claimed is:

1. An actuating device for actuating an externally connected valve, comprising:
   a housing;
   a coil body in said housing, said coil body having a coil winding and enclosing a pole tube at least partially, said pole tube being formed as a receiving sleeve fixed at a free end region thereof at a fixed bearing point;
   a pole core connected to said free end region of said pole tube and having first and second support parts forming said fixed bearing point, delimiting a gap therebetween and clampingly fixing said free end region therein, said first support part including a constriction site of said pole core having a smaller diameter than a remaining outside diameter of said pole core in a region of said fixed bearing point, a step-shaped transition region resulting from said constriction site forming a caulk surface as said second support part; and
   an armature guided for longitudinal displacement at least in said receiving sleeve within an armature space therein and interacting with an actuating part for actuating a respective valve part.

2. An actuating device according to claim 1 wherein
   a reset device acts on said receiving sleeve at a loose bearing point thereof and applies a force to said receiving sleeve in a direction away from said fixed bearing part.

3. An actuating device according to claim 2 wherein
   said receiving sleeve is cylindrical from said loose bearing point toward said fixed bearing point and adjoins said pole core, said pole core being received in and in contact with said receiving sleeve along a guide distance.

4. An actuating device according to claim 2 wherein
   said pole core comprises a lug-shaped annular projection overlapping said armature in each travel position of said armature in an end face region thereof forming a magnetic point of separation delimited to an outside by said receiving sleeve.

5. An actuating device according to claim 2 wherein
   an entire inner periphery of said receiving sleeve is free of an adjoining seal.

6. An actuating device according to claim 2 wherein
   said receiving sleeve is made of high-grade steel material.

7. An actuating device for actuating an externally connected valve, comprising:
   a housing;
   a coil body in said housing, said coil body having a coil winding and enclosing a pole tube at least partially, said pole tube being formed as a receiving sleeve fixed at a free end region thereof at a fixed bearing point;
   a pole core connected to said free end region of said pole tube and having first and second support parts forming said fixed bearing point, delimiting a gap therebetween and clampingly fixing said free end region therein;
   an armature guided for longitudinal displacement at least in said receiving sleeve within an armature space therein and interacting with an actuating part for actuating a respective valve part; and
   a reset device acting on said receiving sleeve at a loose hearing point thereof and applying a force to said receiving sleeve in a direction away from said fixed bearing point, said receiving sleeve including a bottom part located outside said housing and having a widening extending radially outwardly relative to a remaining outside diameter of said receiving sleeve, said widening being at a site of a change in diameter and having a deflection region against which said reset device acts.

8. An actuating device according to claim 7 wherein
   said first support part comprises a constriction site of said pole core having a smaller diameter than a remaining outside diameter of said pole core in a region of said fixed bearing point, a step-shaped transition region resulting from said constriction site forming a caulk surface as said second support part.

9. An actuating device for actuating an externally connected valve, comprising:
   a housing;
   a coil body in said housing, said coil body having a coil winding and enclosing a pole tube at least partially, said pole tube being formed as a receiving sleeve fixed at a free end region thereof at a fixed bearing point;
   a pole core connected to said free end region of said pole tube and having first and second support parts forming said fixed bearing point, delimiting a gap therebetween and clampingly fixing said free end region therein;
   an armature guided for longitudinal displacement at least in said receiving sleeve within an armature space therein and interacting with an actuating part for actuating a respective valve part; and
   a reset device acting on said receiving sleeve at a loose hearing point thereof and applying a force to said receiving sleeve in a direction away from said fixed bearing point, said receiving sleeve being cylindrical from said loose bearing point toward said fixed bearing point and adjoining said pole core, said pole core being received in and in contact with said receiving sleeve along a guide distance, said receiving sleeve including a bent transition region between said fixed bearing point and said guide distance, a free end region of said bent transition region leading to a constriction site between said first and second support parts.

10. An actuating device for actuating an externally connected valve, comprising:
a housing;
a coil body in said housing, said coil body having a coil winding and enclosing a pole tube at least partially, said pole tube being formed as a receiving sleeve fixed at a free end region thereof at a fixed bearing point;
a pole core connected to said free end region of said pole tube and having first and second support parts forming said fixed bearing point, delimiting a gap therebetween and clampingly fixing said free end region therein;
an armature guided for longitudinal displacement at least in said receiving sleeve within an armature space therein and interacting with an actuating part for actuating a respective valve part; and
a reset device acting on said receiving sleeve at a loose bearing point thereof and applying a force to said receiving sleeve in a direction away from said fixed bearing point,
said receiving sleeve being cylindrical from said loose bearing point toward said fixed bearing point and adjoining said pole core, said pole core being received in and in contact with said receiving sleeve along a guide distance, said pole core having an outside diameter along said guide distance smaller than an outside diameter of said pole core in a region of an enclosure of said pole core by a pole plate and at least larger than an outside diameter of said pole core in a region of a constriction site.

11. An actuating device for actuating an externally connected valve, comprising:
a housing;
a coil body in said housing, said coil body having a coil winding and enclosing a pole tube at least partially, said pole tube being formed as a receiving sleeve fixed at a free end region thereof at a fixed bearing point;
a pole core connected to said free end region of said pole tube and having first and second support parts forming said fixed bearing point, delimiting a gap therebetween and clampingly fixing said free end region therein, said first and second support parts extending axially and being radially spaced such that said gap extends axially therebetween, with said free end region extending axially between said first and second support parts and being clamped radially therebetween; and
an armature guided for longitudinal displacement at least in said receiving sleeve within an armature space therein and interacting with an actuating part for actuating a respective valve part.

* * * * *